(12) United States Patent
Kim et al.

(10) Patent No.: US 11,434,126 B2
(45) Date of Patent: Sep. 6, 2022

(54) APPARATUS FOR GENERATING COLD WATER AND WATER PURIFIER (71) Applicant: LG ELECTRONICS INC., Seoul (KR)

(72) Inventors: Jintae Kim, Seoul (KR); Jinpyo Hong, Seoul (KR); Jaegeun Lee, Seoul (KR); Jisun Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 101 days.

(21) Appl. No.: 16/683,434

(22) Filed: Nov. 14, 2019

(65) Prior Publication Data
US 2020/0079639 A1 Mar. 12, 2020

Related U.S. Application Data (63) Continuation of application No. 15/705,919, filed on Sep. 15, 2017.

(30) Foreign Application Priority Data

Oct. 13, 2016 (KR) .......................... 10-2016-0132926

(51) Int. Cl.
F25B 21/02 (2006.01)
F25D 31/00 (2006.01)
(Continued)

(52) U.S. Cl.
CPC ......... B67D 3/0009 (2013.01); B67D 1/0869 (2013.01); B67D 3/0061 (2013.01);
(Continued)

(58) Field of Classification Search
CPC ................ F25B 21/02; F25B 2321/023; F25B 2321/025; F25B 2321/0251; F25D 31/002;
(Continued)

(56) References Cited

U.S. PATENT DOCUMENTS 4,494,380 A * 1/1985 Cross ................. G01N 33/0014
62/3.2
4,829,771 A 5/1989 Koslow
(Continued)

FOREIGN PATENT DOCUMENTS

CN 1288511 3/2001
CN 103270380 8/2013
(Continued)

OTHER PUBLICATIONS

Australian Office Action dated Nov. 27, 2018 issued in Application No. 2017245394.
(Continued)

Primary Examiner — Jerry-Daryl Fletcher
Assistant Examiner — Daniel C Comings
(74) Attorney, Agent, or Firm — KED & Associates LLP (57) ABSTRACT A water cooling apparatus and a water purifier having a water cooling apparatus is provided. The water cooling apparatus may include a case, a water tank provided within the case, a cooling block provided to be in contact with the water tank and to cool the water tank through heat exchange, a thermoelectric element having one side in contact with the cooling block and provided so as to transfer heat from the one side to another side of the thermoelectric element when power is applied thereto, an insulator provided within the case and that covers the water tank and the cooling block, and a heat dissipation block provided outside of the case and provided to be in contact with the other side of the thermoelectric element to dissipate heat from the other side of the thermoelectric element.

15 Claims, 9 Drawing Sheets (51) Int. Cl.
*B67D 3/00* (2006.01)
*B67D 1/08* (2006.01)

(52) U.S. Cl.
CPC ............ *F25B 21/02* (2013.01); *F25D 31/002* (2013.01); *F25D 31/006* (2013.01); *C02F 2307/10* (2013.01); *F25B 2321/023* (2013.01); *F25B 2321/025* (2013.01); *F25B 2321/0251* (2013.01)

(58) Field of Classification Search
CPC ... F25D 31/006; B67D 1/0869; B67D 3/0009; B67D 3/0061; C02F 2307/10; H01L 33/645; H01L 35/28; H01L 35/30
See application file for complete search history.

(56) References Cited

U.S. PATENT DOCUMENTS

| | | | | |
|---|---|---|---|---|
| 4,833,888 | A | * | 5/1989 | Kerner .................... B01D 61/08 62/3.3 |
| 5,247,798 | A | * | 9/1993 | Collard, Jr. ............ F25B 21/02 221/266 |
| 5,367,879 | A | | 11/1994 | Doke et al. |
| 5,493,864 | A | | 2/1996 | Pomerene |
| 5,865,031 | A | | 2/1999 | Itakura |
| 6,119,464 | A | | 9/2000 | Nakayama |
| 8,468,837 | B2 | * | 6/2013 | Pinet ....................... F25B 21/02 62/3.6 |
| 2004/0134932 | A1 | | 7/2004 | Lobdell |
| 2006/0260325 | A1 | | 11/2006 | Lin |
| 2011/0225981 | A1 | | 9/2011 | Glaros |
| 2012/0186272 | A1 | * | 7/2012 | Son .......................... F25D 11/00 62/3.3 |
| 2014/0223942 | A1 | | 8/2014 | Lee et al. |
| 2016/0282040 | A1 | * | 9/2016 | Wenji ..................... F25B 21/02 |

FOREIGN PATENT DOCUMENTS

| | | | |
|---|---|---|---|
| CN | 104024771 | | 9/2014 |
| JP | 09152246 A | * 6/1997 | ........... B67D 1/0869 |
| KR | 10-2002-0021228 | | 3/2002 |
| KR | 10-0836717 | | 6/2008 |
| KR | 10-2015-0094360 | | 8/2015 |
| WO | WO 2012/091499 | | 7/2012 |

OTHER PUBLICATIONS

Chinese Office Action (with English translation) dated Aug. 8, 2019 issued in CN Application No. 201710942925.1.
Indian Office Action dated Feb. 18, 2020 issued in IN Application No. 201714032680.

* cited by examiner

APPARATUS FOR GENERATING COLD WATER AND WATER PURIFIER

CROSS-REFERENCE TO RELATED APPLICATIONS

This application is a Continuation Application of U.S. application Ser. No. 15/705,919, filed Sep. 15, 2017, which claims priority under 35 U.S.C. § 119 to Korean Application No. 10-2016-0132926, filed on Oct. 13, 2016, whose entire disclosures are incorporated herein by reference.

BACKGROUND

1. Field

A cold water generating apparatus to cool water for drinking is provided.

2. Background

A water purifier may be an apparatus that filters water, such as, e.g., tap water or service water, supplied from a water supply source via physical and chemical methods to remove impurities therefrom and supply purified water. Water purifiers may be classified as, e.g., a natural filtration type, a direct filtration type, an ion-exchange resin type, a distillatory type, and a reverse osmosis type, according to a water purification principle or a water purification method. A water purifier may include a storage type water purifier that stores water purified through a filter in a storage tank and may heat or cool the purified water upon discharge from the tank, and a direct type water purifier that may heat or cool water purified through a filter and discharge the purified water without a storage tank.

A related art water purifier may cool water accommodated in a cold water tank using a refrigerating cycle. In a refrigerating cycle system, an evaporator in which refrigerant flows may be provided within or outside of a cold water tank to cool water accommodated in the cold water tank. However, since the refrigerating cycle system requires a compressor, a condenser, and an expansion valve or a capillary, as well as an evaporator, the refrigerating cycle system has a complicated configuration and may occupy a large installation space, such that it may be difficult to reduce a size of a water purifier.

When power is applied to a thermoelectric element, heat may be transmitted from one side of the thermoelectric element to another side thereof. Thus, a cold water tank may be cooled by simply connecting a power source to the thermoelectric element, and in this case, since an evaporator, a compressor, a condenser, may not be required, a configuration of such an apparatus may be simple and an installation space thereof may be reduced, compared with existing refrigerating cycle systems.

Figure 9:
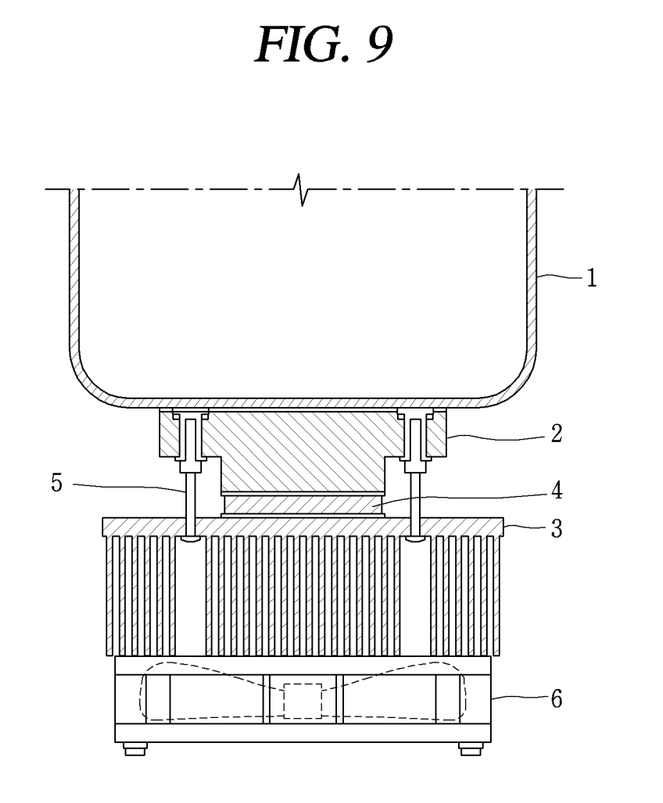
FIG. 9 is a conceptual view of a related art water cooling apparatus that cools a cold water tank using a thermoelectric element.

FIG. 9 is a conceptual view of a related art water cooling apparatus that cools a cold water tank using a thermoelectric element. One side of a thermoelectric element 4 may be in contact with a cold block 2 connected to a cold water tank 1, and another side of the thermoelectric element 4 may be in contact with a heat block 3 having a fan 6. When the thermoelectric element 4 is driven, heat may be transmitted from water in the cold water tank 1 to the cold block 2, the thermoelectric element 4, and the heat block 3, and, due to a temperature difference between one side and the other side of the thermoelectric element 4, the cold block 2 may become cold and the heat block 3 may become hot. Heat transmitted to the heat block 3 may be heat-exchanged with air introduced to the heat block 3 from outside according to driving of the fan 6 so as to be outwardly dissipated, cooling the water in the cold water tank 1.

The cold block 2 and the heat block 3 may be connected and fastened to each other by a plurality of fasteners 5, such as screws, adhered to the outside of the cold water tank 1. However, when the cold block 2 and the heat block 3 are heat-exchanged through the fastener 5 connecting the cold block 2 and the heat block 3, some of the heat to be dissipated outside of the heat block 3 may be re-transmitted to the cold block 2 through the fastener 5 (e.g., a screw). Heat transmission to the cold block 2 may increase a temperature of the cold block 2, degrading cooling performance.

BRIEF DESCRIPTION OF THE DRAWINGS

The embodiments will be described in detail with reference to the following drawings in which like reference numerals refer to like elements wherein.

DETAILED DESCRIPTION

An apparatus to generate cold water according to the present disclosure may be applied to a direct type water purifier that may dispense cold water or a refrigerator in which a water dispenser may be installed. The apparatus according to the present disclosure may be a water cooling apparatus that generates cold water by cooling water purified by a filter.

Figure 1:
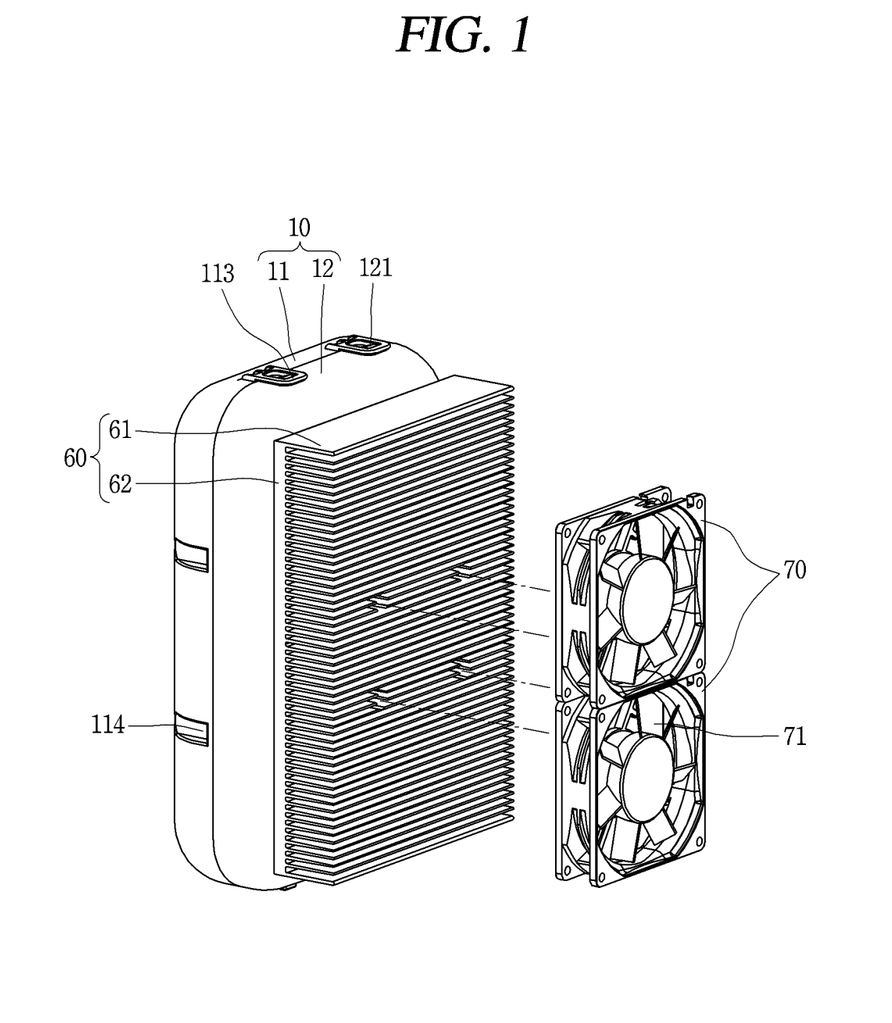
FIG. 1 is a perspective view of an apparatus for cold water according to the present disclosure.

Referring to FIG. 1, the water cooling apparatus may include a case 10, a heat dissipation block 60, and a fan 70. The case 10 may have a flat rectangular shape. Corners of the case 10 may be rounded. The case 10 may be vertically provided. The case 10 may be formed of plastic and manufactured through injection molding.

The heat dissipation block 60 may dissipate heat from a rear side of the case 10. The heat dissipation block 60 may be in contact with air to be heat-exchanged so as to dissipate heat. The heat dissipation block 60 may include a heat dissipation plate 61 and a heat dissipation fin 62. The heat dissipation plate 61 may have a rectangular shape and may be in contact with a thermoelectric element or cooler 40 mounted on a rear side of the case 10 to outwardly dissipate heat generated by the thermoelectric element 40. The heat dissipation fin 62 may be provided in plurality and may protrude backwardly from the heat dissipation plate 61 to expand a contact area for air.

The plurality of heat dissipation fins 62 may extend in a transverse direction and may be spaced apart from each other in a longitudinal direction. A direction in which air is discharged may be varied depending on a direction in which the heat dissipation fins 62 extend. For example, when the case 10 and the heat dissipation block 60 are vertically provided within the water cooling apparatus or water purifier and an extending direction of the heat dissipation fins 62 is a transverse direction, hot air heat-exchanged with the heat dissipation plate 61 and the heat dissipation fins 62 may be outwardly discharged from an inside of the water purifier in a lateral direction. If an extending direction of the heat dissipation fins 62 is a vertical direction, hot air heat-exchanged with the heat dissipation fins 62 may be discharged in a vertical direction from the inside of the water purifier, and a separate air duct may be provided to discharge hot air to the outside of the water purifier and may increase a size of the water purifier.

The fan 70 may be vertically installed on the rear side of the heat dissipation fins 62. The fan 70 may blow ambient air to the heat dissipation fins 62 to allow ambient air to be in contact with the heat dissipation fins 62 and the heat dissipation plate 61 to dissipate heat from the heat dissipation plate 61 and the heat dissipation fins 62 through heat exchange.

Figure 2:
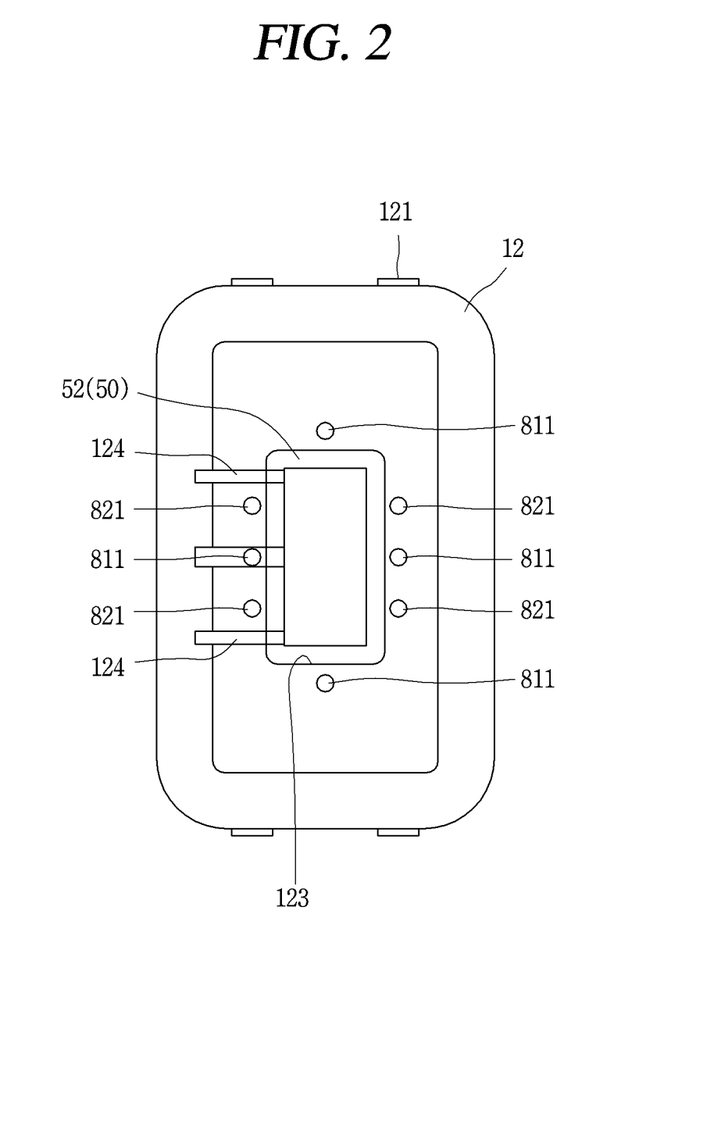
FIG. 2 is a rear view of a case according to the present disclosure.

Referring to FIG. 2, a rectangular through hole 123 may be provided on a rear surface of the case 10, and a plurality of fastening parts 811, 821 may be provided along edges of the through hole 123. The through hole 123 may be provided at a center of the rear surface of the case 10. A plurality of thermoelectric elements 40 (e.g., two thermoelectric elements) may be provided up and down in the through hole 123. Also, a portion of an insulator 50 may protrude to the inside of the through hole 123 to surround edges of the thermoelectric element 40. The insulator 50 may block transmission of heat from outside to the thermoelectric element 40.

Among the plurality of fastening parts, four first fastening parts 811 may be respectively provided on upper, lower, left and right sides of the through hole 123, and two second fastening parts 821 may be provided on both sides of each of the first fastening parts 811 on the left and right sides of the through hole 123. The first fastening parts 811 may fasten a cooling block 30 and the case 10, and the second fastening parts 821 may fasten the heat dissipation block 60 and the case 10. The cooling block 30 and the heat dissipation block 60 may be fastened to separate positions of the case 10 by the first fastening part 811 and the second fastening part 821 in order to block transmission of heat from the heat dissipation block 60 to the cooling block 30.

Figure 3:
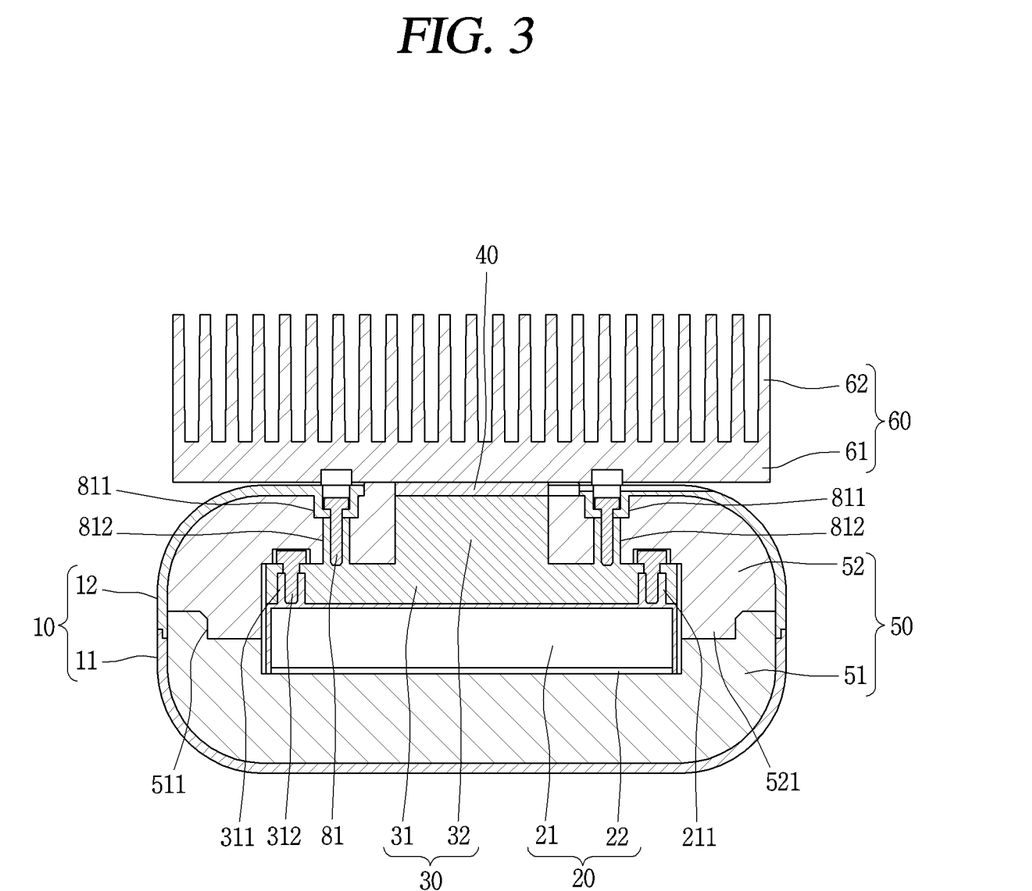
FIG. 3 is a cross-sectional view of a fastening structure of a cooling block and a case according to the present disclosure.

Referring to FIG. 3, a cold water tank 20, the cooling block 30, and the insulator 50 may be provided within the case 10. The heat dissipation block 60 may be provided outside of the case 10. The thermoelectric element 40 may be provided between the cooling block 30 and the heat dissipation block 60. The cold water tank 20 may be an airtight tank. The cold water tank 20 may have a space that allows water to flow therein. Ice 24 may be formed within the cold water tank 20. The cold water tank 20 may be formed as a flat rectangular body. One side of the cooling block 30 may be in contact with the cold water tank 20 to transmit heat from the cold water tank 20 to the cooling block 30. The cooling block 30 may be formed of aluminum having a high heat transfer coefficient.

The cooling block 30 may include a first cooling block part 31 and a second cooling block part 32. One side of the first cooling block part 31 may be in contact with the cold water tank 20, and one side of the second cooling block part 32 may be in contact with the thermoelectric element 40. Heat may be transmitted or transferred between one side of the first cooling block part 31 and an upper surface of the cold water tank 20 and between the one side of the second cooling block part 32 and one side of the thermoelectric element 40. Heat from the cold water tank 20 may be transmitted to the first cooling block part 31 through heat exchange, and heat may be transmitted from the second cooling block part 32 to the thermoelectric element 40.

An area of the first cooling block part 31 may be equal to an area of the cold water tank 20. Since contact areas of the cold water tank 20 and the first cooling block part 31 may be equal, heat transmission may uniformly be made on an entire surface of the cold water tank 20. Accordingly, ice 24 may be generated to have a uniform thickness within the cold water tank 20. A thickness of a layer of the ice 24 may be ⅓ to ⅔ of a thickness of a tank body 21. The thickness of a layer of the ice 24 may be about ½ of the thickness of the tank body 21.

The second cooling block part 32 may have an area smaller than an area of the first cooling block part 31. The area of the second cooling block part 32 may be equal to an area of the thermoelectric element 40. Since contact areas of the second cooling block part 32 and the thermoelectric element 40 may be equal, heat may be uniformly transmitted on an entire surface of the second cooling block 30.

The second cooling block part 32 may protrude from a middle portion of the first cooling block part 31. A height or thickness of the second cooling block part 32 in contact with the thermoelectric element 40 may be set to be different depending on a type of the insulator 50. For example, when the insulator 50 is formed of a polyurethane (PU) material, a height of the second cooling block part 32 may be set to 17.5 mm or greater. When the insulator 50 is formed of an expanded polystyrene (EPS) material, a height of the second cooling block part 32 may be set to 24.8 mm or greater. When the insulator 50 is formed of a vacuum insulation panel (VIP) material, a height of the second cooling block part 32 may be set to 5 mm or greater. If a thickness of a second insulator 52 surrounding the second cooling block part 32 is too small, cool air from the cooling block 30 and heat from the heat dissipation block 60 may be heat-exchanged to degrade cooling efficiency of the thermoelectric element 40 and generate condensation in or on the cooling block 30.

A gap between the first cooling block part 31 and the heat dissipation block 60 may be adjusted according to a height of the second cooling block part 32. The second cooling block part 32, except a surface thereof in contact with the thermoelectric element 40, may be configured to be surrounded by the second insulator 52. Accordingly, condensation on the cooling block 30 may be prevented.

Referring to FIG. 3, the cold water tank 20, the cooling block 30, and the thermoelectric element 40 may be stacked in one direction and coupled to each other within the case 10. The insulator 50 may fill an internal space of the case 10 and may surround the cold water tank 20, the cooling block 30, and the thermoelectric element 40. Accordingly, leakage of cold air from the cold water tank 20, the cooling block 30, and the thermoelectric element 40 may be minimized. The insulator 50 may be formed of various materials, such as, e.g., EPS.

Referring to FIG. 3, a thermal grease may be applied between an upper surface of the cold water tank 20 and a lower side of the first cooling block part 31 and between an upper side of the second cooling block 30 and one side surface of the thermoelectric element 40 to fill a gap between the cold water tank 20 and the cooling block 30 and between the cooling block 30 and the thermoelectric element 40 to ensure desirable heat transmission.

A plurality of first fastening parts 811 may be formed on an upper surface (or rear surface in relation to FIG. 1) of the case 10. The first fastening part 811 may be formed by depressing a portion of an upper surface of the case 10 such that a bolt head may be accommodated therein. A through hole allowing a fastener 81 such as a bolt to penetrate therethrough may be formed on a lower surface of the first fastening part 811. A bolt head may be surrounded by the insulator 50 to prevent cold air from the cooling block 30 from being leaked to the outside through the bolt head.

A plurality of fastener holders 812 may be formed on first cooling block part 31 that extend from a surface of the first cooling block part 31 towards the first fastening part 811. The plurality of fastener holders 812 may be formed to each receive a fastener 81 therein. The plurality of fastener holders 812 may contact the lower surface of the first fastening part 811. The fastener 81 may penetrate through the through hole of the lower surface of the first fastening part 811 and may be received in the fastener holder 812 so that the second case 12 may be connected or fastened to the cooling block 30.

A plurality of first coupling parts or screw holders 211 into which a screw may be fastened are formed on an upper surface of the first cooling block part 31. The plurality of first fastening parts 811 and the first coupling parts 211 may be provided to face each other in a thickness direction of the second cooling block part 32. The plurality of first fastening parts 811 may be formed in upper, lower, and left, right sides of the through hole 123 along edges of the through hole 123 of the case 10. The plurality of first coupling parts 211 may be coupled to the first cooling block part 31, may be spaced apart from the side of the second cooling block part 32, and may protrude from the tank body 21 in an upward direction. The first fastening part 811 of the case 10 and the first coupling part 211 of the first cooling block part 31 may be fastened by a first fastener 81 such as a bolt, so that the cooling block 30 may be coupled to a portion of the rear surface of the case 10.

Figure 4:
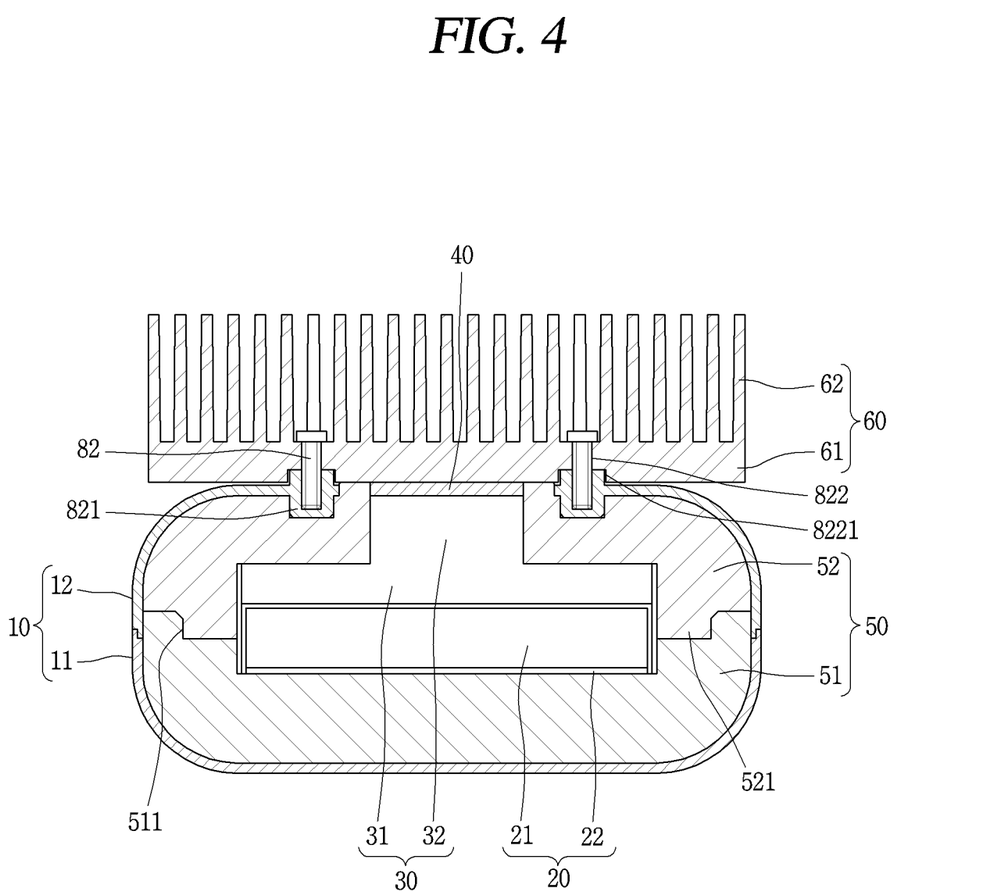
FIG. 4 is a cross-sectional view of a fastening structure of a heat dissipation block and a case according to the present disclosure.

Referring to FIG. 4, a plurality of second fastening parts 821 may be formed on an upper surface (or rear surface in relation to FIG. 1) of the case 10. Two second fastening parts 821 may be provided in left and right edge portions of the through hole 123 in a vertical direction with the first fastening part 811 formed on left and right edges of the through hole 123 interposed therebetween. A lower portion of the second fastening part 821 may be depressed in a downward direction or inward direction of the case 10, and an upper portion of the second fastening part 821 may protrude in an upward direction or outward direction of the case 10. A fastening recess or screw hole may be formed within the second fastening part 821 to allow a screw to be inserted therein.

A plurality of second coupling parts 822 may be formed in the heat dissipation plate 61 and face the second fastening parts 821. A fastening hole 525 may be formed within the second coupling part 822 such that a bolt may penetrate therethrough. An insertion recess 8221 may be formed in a lower portion of the second coupling part 822, and thus, an upper portion of the second fastening part 821 may be inserted and coupled to the insertion recess 8221 of the second coupling part 822.

The second fastening part 821 of the case 10 and the second coupling part 822 of the heat dissipation plate 61 may be fastened by a second fastener 82 such as, e.g., a bolt or screw, so that the heat dissipation block 60 may be coupled to another portion of the rear surface of the case 10. The first and second fasteners 81 and 82 may be formed of an stainless steel (SUS) material. Since the cooling block 30 and the heat dissipation block 60 are fastened to the rear surface of the case 10 from separate positions, transmission of heat from the heat dissipation block 60 to the cooling block 30 through the fastener 80 may be prevented.

Figure 5:
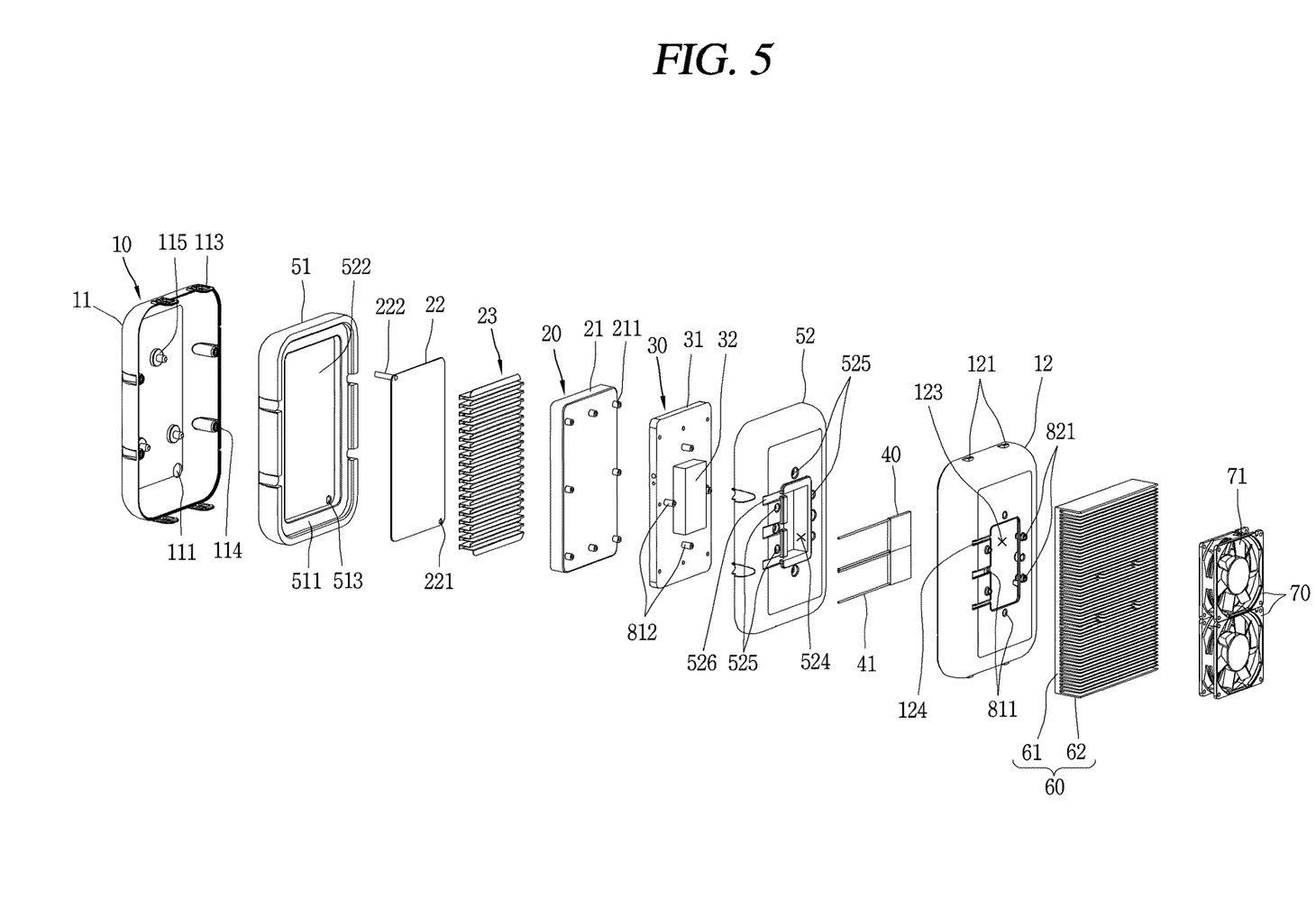
FIG. 5 is an exploded perspective view of the apparatus of FIG. 1 viewed from a rear.
Figure 6:
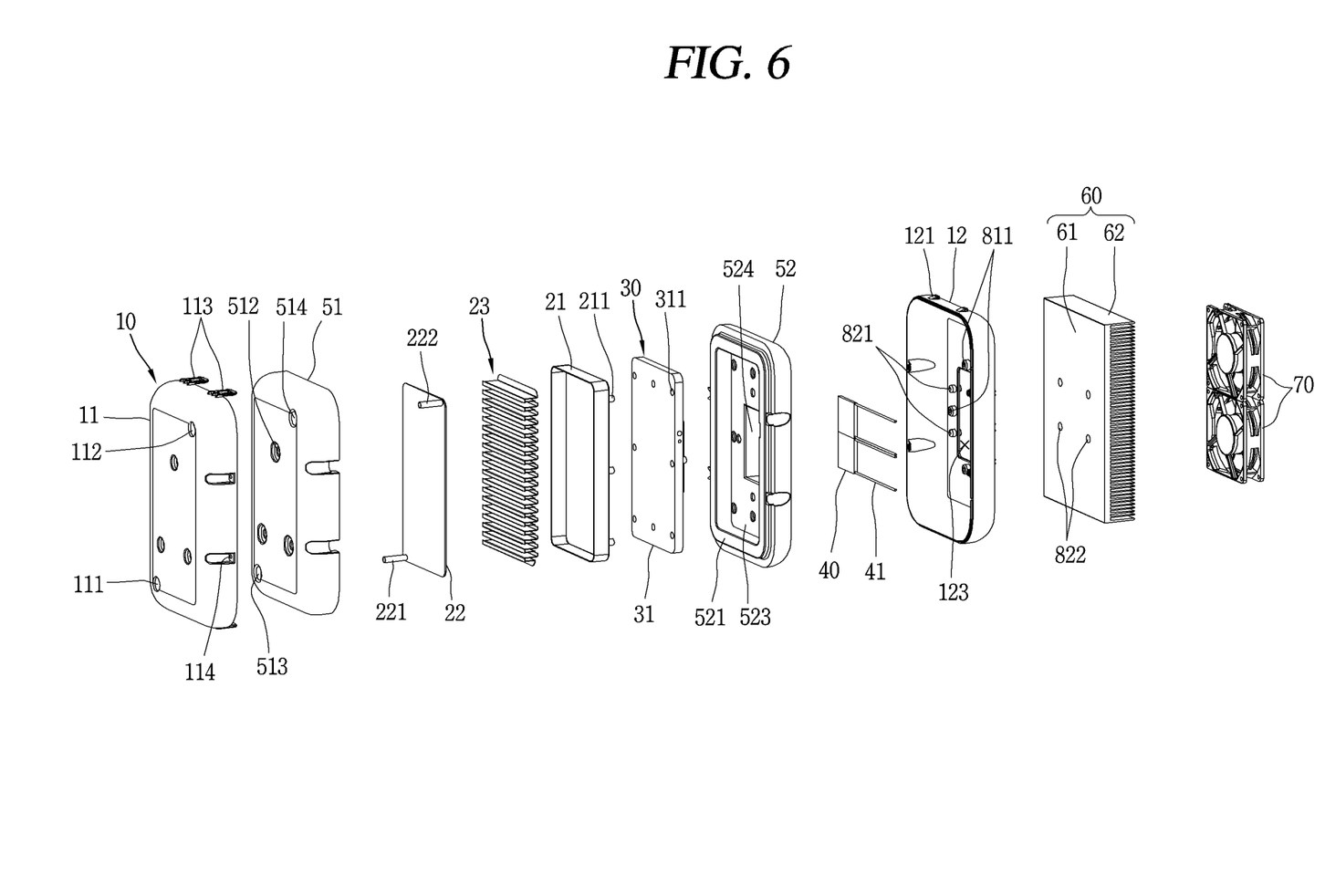
FIG. 6 is an exploded perspective view of the apparatus of FIG. 1 viewed from a front.
Figure 7:
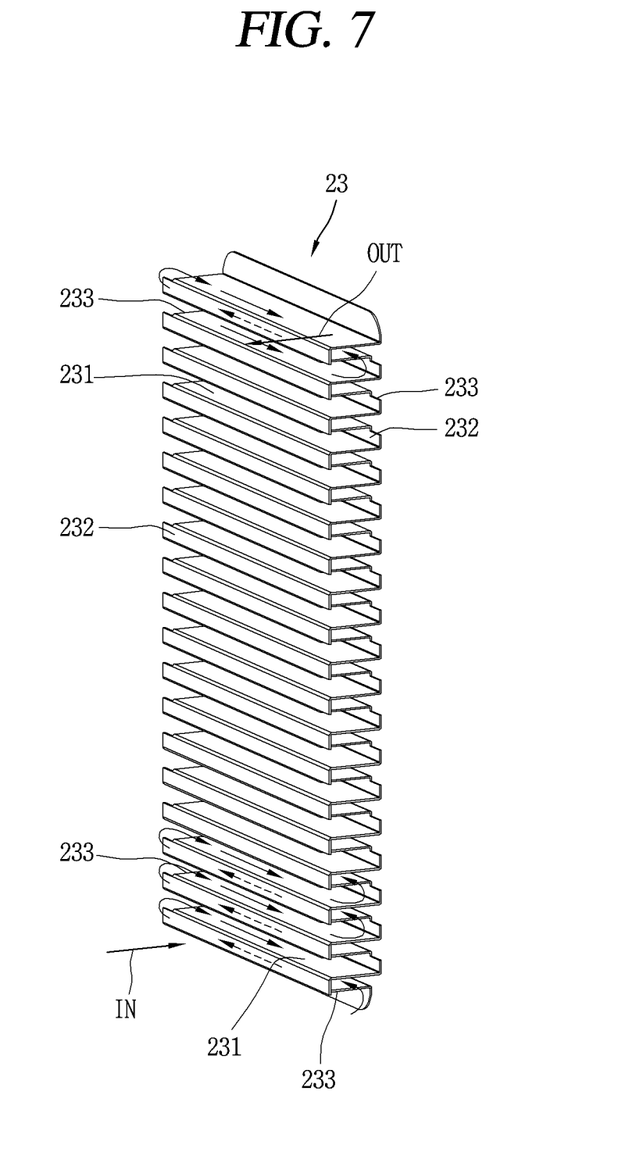
FIG. 7 is an enlarged perspective view of an internal flow channel of FIG. 6.

FIG. 5 and FIG. 6 are exploded perspective views of the water cooling apparatus of FIG. 1, in which FIG. 5 illustrates the water cooling apparatus viewed from a rear side and FIG. 6 illustrates the water cooling apparatus viewed from a front side. FIG. 7 is an enlarged perspective view of an internal flow channel 23 of FIG. 6.

Referring to FIG. 5 and FIG. 6, the case 10 may include a first case 11 and a second case 12. The first case 11 may form a front surface and side surfaces of the case 10, and the second case 12 may form a rear surface and side surfaces of the case 10. The first and second cases 11 and 12 may be provided to be symmetrical in a forward/backward direction, and may be coupled when edges thereof are in contact with each other. Two locking parts or latches 113 may be formed at each of upper and lower sides of the first case 11, and two locking protrusions or latch holders 121 may be formed at each of upper and lower sides of the second case 12. As the locking protrusions 121 may be coupled to an inner side of the locking parts 113, the first case 11 and the second case 12 may be assembled as one assembly. Two portions of left and right side surfaces of the first and second cases 11 and 12 may be fastened by bolts. A plurality of bolt holes 114 may be formed on side surfaces of the first case 11, and a plurality of recesses 116 may be formed on sides of the second case 12 so that the first and second cases 11 and 12 may be fastened by bolts.

The insulator 50 may include a first insulator 51 provided within the first case 11 and a second insulator 52 provided within the second case 12. A coupling recess or groove 511 may be formed along edges of an inner side surface of the first insulator 51, and a coupling protrusion or flange 521 may be formed along edges of an inner side surface of the second insulator 52. As the coupling protrusion 521 is inserted into the coupling recess 511, the first and second insulators 51 and 52 may be coupled to each other.

A plurality of fixing protrusions 115 may be formed on an inner side surface of the first case 11, and a plurality of fixing recesses 512 may be formed on an outer front surface of the first insulator 51. When the fixing protrusions 115 are inserted into the fixing recesses 512, the first insulator 51 may be fixed to the first case 11.

A first mounting recess 522 may be formed on an inner side surface of the first insulator 51, and one side of the cold water tank 20 may be accommodated and fixed to the first mounting recess 522.

The cold water tank 20 may include a tank body 21 having an internal flow channel 23 therein and a cover 22 having a water inlet 221 and a water outlet 222. The water inlet 221 and the water outlet 222 may have a pipe shape. The cold water tank 20 may have a flat rectangular shape.

A water inlet insertion hole 513 may be formed in a lower corner portion of the first mounting recess 522 of the first insulator 51, and a water outlet insertion hole 514 may be formed in an upper corner portion of the first mounting recess 522. The water inlet 221 and the water outlet 222 may be inserted into the water inlet insertion hole 513 and the water outlet insertion hole 514, respectively. A water inlet insertion hole 111 may be formed in a lower corner portion of a front surface of the first case 11, and a water outlet insertion hole 112 may be formed in an upper corner portion of the front surface of the first case 11. The water inlet 221 and the water outlet 222 may be inserted into the water inlet insertion hole 111 and the water outlet insertion hole 112, respectively.

The cover 22 may be provided to cover a front side of the tank body 21, and when edges of the cover 22 are coupled to edges of the front surface of the tank body 21 through welding, an accommodation space inside of the tank body 21 may be hermetically closed. The water inlet 221 may be formed in a lower corner portion of the cover 22, and the water outlet 222 may be formed in an upper corner portion of the cover 22. Purified water introduced to the inside of the tank body 21 through the water inlet 221 may be moved in a direction opposite to gravity within the accommodation space of the tank body 21 and ejected through the water outlet 222.

A plurality of coupling parts 211 may protrude from a rear surface of the tank body 21. A female thread may be formed on an inner side of the plurality of coupling parts 211. A plurality of coupling recesses 311 may be formed on a front surface of the first cooling block part 31 and correspond to the plurality of coupling parts 211. A through hole allowing a bolt to penetrate therethrough may be formed in each of the plurality of coupling recesses 311. When the front surface of the first cooling block part 31 and a rear surface of the tank body 21 come into contact with each other, the plurality of coupling parts 211 may be inserted into the plurality of coupling recesses 311 and a plurality of bolts 312 may be inserted into a through hole of each of the plurality of coupling recesses 311 and female threads of the plurality of coupling parts 211 so as to be fastened, whereby the cold water tank 20 and the cooling block 30 may be fastened to each other.

A second mounting recess 523 may be formed on an inner side surface of the second insulator 52, and a rear portion of the cold water tank 20 and the first cooling block part 31 may be mounted in the second mounting recess 523. A mounting hole 524 may be formed at a center of an inside of the second mounting recess 523. The second cooling block part 32 may be inserted and mounted in the mounting recess 523. A rear side of the mounting hole 524 may be formed to correspond to the through hole 123 formed on a rear surface of the second case 12. A plurality of thermoelectric elements 40 may be in contact with the other side of the second cooling block part 32 and accommodated within the mounting hole 524 and covered by the second insulator 52.

A plurality of fastening holes 525 may be formed on the edges of the mounting hole 524 of the second insulator 52, and a plurality of first fasteners 81 and second fasteners 82 may penetrate through the plurality of fastening holes 525, respectively. As the second fastener 82 may be fastened to the second coupling part 822 of the first cooling block part 31 through the second fastening part 821 of the second case 12 and the fastening hole 525 of the second insulator 52, the second insulator 52, the cold water tank 20, and the cooling block 30 may be fastened to the rear surface of the second case 12.

The thermoelectric element 40 may employ or exhibit the Peltier effect. The Peltier effect refers to a phenomenon in which when a DC voltage is applied to both ends of two different elements, heat absorption occurs on one side and heating occurs on another side. The thermoelectric element 40 may be manufactured as a thin film. The plurality of thermoelectric elements 40 may be installed on the other side of the second cooling block part 32 and may cool the cold water tank 20 through heat absorption of the thermoelectric element 40. A plurality of electrodes 41 may be formed on one side of each of the plurality of thermoelectric elements 40, and power such as, e.g., a DC voltage, may be applied to the plurality of electrodes 41.

A plurality of electrode fixing parts 526 may be formed on a rear surface of the second insulator 52, and a plurality of electrodes 41 may be inserted and fixed to the electrode fixing parts 526. A plurality of electrode fixing parts 124 may be formed on a rear surface of the second case 12 and the plurality of electrodes may be inserted and fixed to the plurality of electrode fixing parts 124.

Referring to FIG. 7, the internal flow channel 23 may include a plurality of partitions 231 extending in a horizontal direction and provided to be spaced apart from each other in a vertical direction and a plurality of connectors 232 extending in a vertical direction and connecting two mutually adjacent partitions 231. The plurality of connectors 232 may be alternately provided at a front end and a rear end of each of the partitions 231 to connect the plurality of partitions 231. Each of the plurality of partitions 231 may have a communication hole, such as, e.g., a passageway or gap, 233 formed at a left end portion or a right end portion thereof.

The plurality of partitions 231 may prevent water from flowing in an upward direction and may guide a flow of water in a leftward or rightward direction. The communication hole 233 may allow an upper flow channel and a lower flow channel partitioned by the plurality of partitions 231 to communicate with each other to guide water to flow from the lower flow channel to the upper flow channel.

According to a structure of the internal flow channel 23, water introduced to a lowermost portion of the internal flow channel 23 may be raised or moved through a first communication hole 233 formed at a right end portion of a first partition 231 at the lowermost part, and may move or flow to the left along a second partition 231 positioned above the first partition 231. Subsequently, purified water may be raised or may flow up through the second communication hole 233 formed at a left end portion of the second partition 231 and may move or flow to the right along a third partition 231 positioned above the second partition 231. Then, purified water may move or flow in a leftward or rightward direction along fourth to Nth partitions 231, may be raised through a third communication hole 233 of the third partition 231 to a communication hole 233 of the Nth partition 231 to flow in a zigzag manner up along the internal flow channel 23. Some of the purified water introduced through the water inlet 221 may be cooled by the thermoelectric element 40 in the internal flow channel 23 and phase-changed to ice 24 having a predetermined thickness. Purified water introduced when the ice 24 is generated may flow along the internal flow channel 23 so as to be sufficiently heat-exchanged with the ice 24. Accordingly, a predetermined amount of cold water may be made.

Referring to an assembly order of the water cooling apparatus according to the present disclosure, first, the cold water tank 20 and the cooling block 30 may be coupled, and bolts or fasteners may be fastened to eight portions such that the cold water tank 20 and one side of the first cooling block part 31 may be properly in contact with each other. The first insulator 51 and the second insulator 52 may be coupled with the assembly of the cold water tank 20 and the cooling block 30 interposed therebetween such that the first insulator 51 and the second insulator 52 cover the assembly of the cold water tank 20 and the cooling block 30. The first case 11 and the second case 12 may be coupled with the insulator 50 including the cold water tank 20 and the cooling block 30 interposed therebetween, and subsequently assembled to each other.

The cooling block 30 may be fastened to a portion of a rear surface of the second case 12 by first fasteners 81 such that the cooling block 30 may be fastened to the first fastening part 811 formed on the rear surface of the second case 12. A plurality of thermoelectric elements 40 may be mounted on the other side of the second cooling block part 32. The heat dissipation block 60 may be coupled such that the heat dissipation plate 61 may be properly in contact with the other side of the thermoelectric elements 40. The heat dissipation block 60 may be fastened to another portion of the rear surface of the second case 12 by second fasteners 82. Finally, a plurality of fans 70 may be vertically mounted at the center of a rear surface of the heat dissipation block 60.

Figure 8:
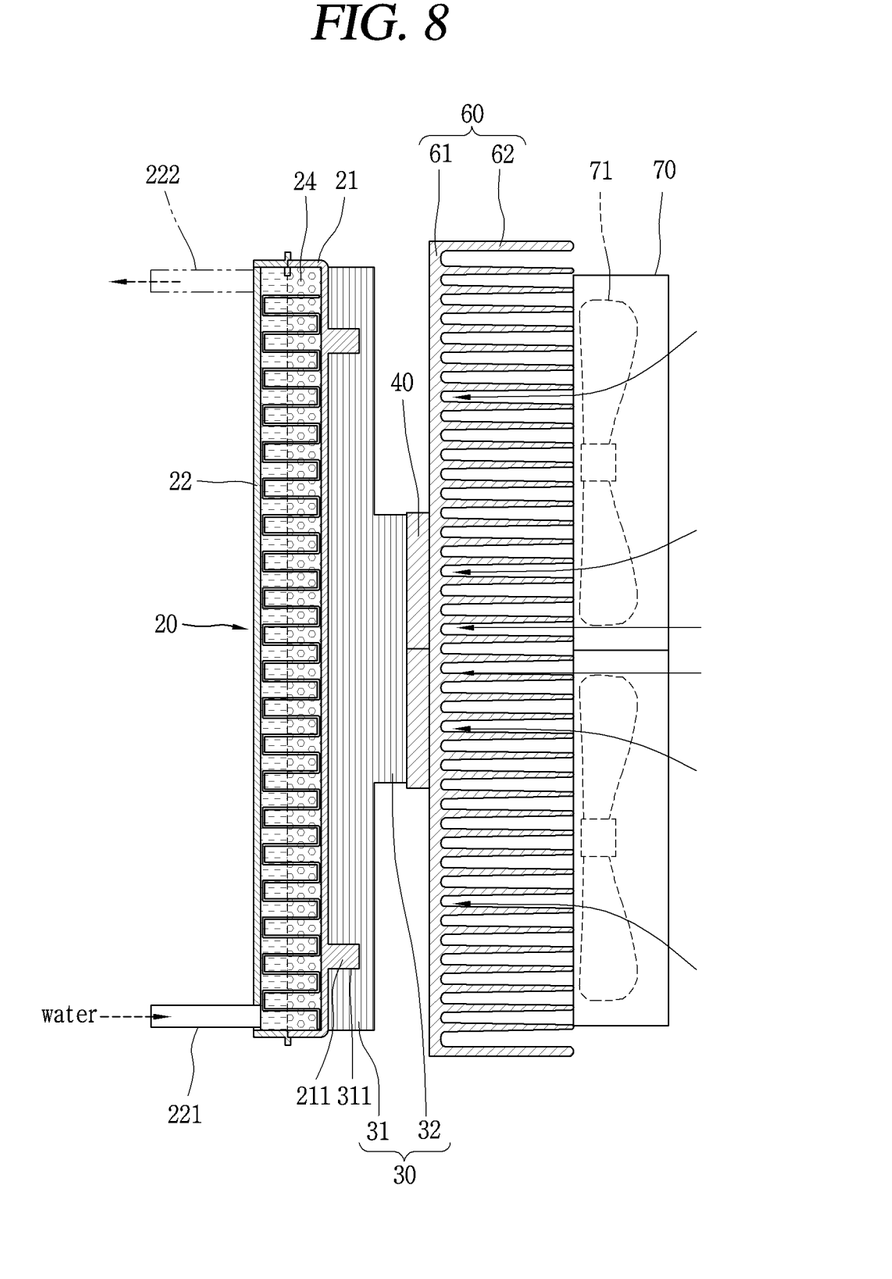
FIG. 8 is a view of a cooling operation of a cold water tank using a thermoelectric element according to the present disclosure.

Referring to FIG. 8, when power is applied to operate the thermoelectric element 40, heat may be transmitted from one side (for example, the left side) of the thermoelectric element 40 to another side (for example, the right side). One side of the thermoelectric element 40 may perform heat absorption and the other side of the thermoelectric element 40 may perform heating. Through heat absorption of the thermoelectric element 40, heat may be transmitted from the cold water tank 20 to one side of the first cooling block part 31. Heat from the first cooling block part 31 may be transmitted to the other side of the second cooling block part 32, and heat may be transmitted from the other side of the second cooling block part 32 in contact with one side of the thermoelectric element 40 to one side of the thermoelectric element 40. In this manner, the cold water tank 20 may be cooled by heat absorption of the thermoelectric element 40.

The other side of the thermoelectric element 40 may be in contact with the heat dissipation plate 61 of the heat dissipation block 60, and may be heat-exchanged with air introduced to the heat dissipation fins 62 and the heat dissipation plate 61 by the fan 70 to outwardly dissipate heat from the thermoelectric element 40.

Blades 71 installed within each of a plurality of fans 70 may be provided to overlap the plurality of thermoelectric elements 40 in a thickness direction and ambient air may be blown towards a central portion of the heat dissipation plate 61 overlapping the other side of the thermoelectric element 40 in a thickness direction to further enhance heat dissipation efficiency of the heat dissipation block 60.

A coolant or cooling water filtered by a filter may be introduced to the inside of the tank body 21 through the water inlet 221 of the cold water tank 20. The introduced purified water may move or flow in a zigzag along the internal flow channel 23 and may be raised or flow up to fill the inside of the tank body 21. Some of the purified water may remain in the internal flow channel 23 and may be cooled through heat absorption of the thermoelectric element 40 so as to be phase-changed to ice 24. Purified water introduced through the water inlet 221 may be heat-exchanged with the ice 24, while moving up along the internal flow channel 23, so as to be cooled and changed to cold water and ejected through the water outlet 222.

A thickness of the ice 24 may be adjusted by a temperature sensor installed on an upper side of the tank body 21. For example, the temperature sensor may sense a temperature of purified water and may be installed in a position corresponding to a half in a thickness direction on the rear surface (or contact surface with the cooling block 30) of the tank body 21. Purified water may start to be frozen from the rear surface of the tank body 21 in contact with the cooling block 30, and when the ice 24 is generated to a portion where the temperature sensor is positioned, a temperature sensed by the temperature sensor may be rapidly lowered to a temperature below zero, and a controller may stop operation of the thermoelectric element 40. When operation of the thermoelectric element 40 is stopped, the ice 24 may be melted by heat exchanged between purified water and the ice 24, and when a temperature of purified water is increased again to be higher than a preset temperature, an operation of the thermoelectric element 40 may be resumed.

Embodiments disclosed herein may provide a water cooling apparatus that generates or produces cold water in which transmission of heat, which is to be outwardly dissipated from a heat dissipation block to a cooling block may be prevented, and a water purifier having the water cooling apparatus.

According to embodiments disclosed herein, an apparatus such as a water cooling apparatus that generates cold water may include a case; a cold water tank provided within the case; a cooling block provided to be in contact with the cold water tank and to cool the cold water tank through heat conduction or heat exchange; a thermoelectric element provided such that one side thereof is in contact with the cooling block and performing heat transmission from the one side to the other side when power is applied thereto; an insulator provided within the case and covering the cold water tank and the cooling block; and a heat dissipation block provided outside of the case and provided to be in contact with the other side of the thermoelectric element to dissipate heat from the other side of the thermoelectric element.

The cooling block and the heat dissipation block may be separately fastened to the case. The cooling block and the heat dissipation block may be provided to be spaced apart from each other with a rear surface of the case and a thermoelectric element accommodated in a through hole of the rear surface of the case interposed therebetween.

The cooling block may be fastened to a portion of the rear surface of the case by a plurality of first coupling parts formed to be spaced apart from each other on a rear surface of the cooling block and a plurality of fasteners fastened to the plurality of first coupling parts, and the heat dissipation block may be fastened to another portion of the rear surface of the case by a plurality of second coupling parts formed to be spaced apart from each other along the edges of the through hole on the rear surface of the case and a plurality of second fasteners fastened to the plurality of second coupling parts.

The plurality of first fastening parts and the plurality of second fastening parts may be alternately provided along the edges of the through hole. One side of the cooling block may be in contact with a rear surface of the cold water tank and the other side thereof may be in contact with one side of the thermoelectric element, and a contact area of the one side of the cooling block may be equal to a size of the cold water tank.

The cooling block may include a first cooling block part in contact with the cold water tank; and a second cooling block part extending from a rear surface of the first cooling block part, having an area smaller than that of the first cooling block part, and provided to be in contact with the thermoelectric element. A height of the second cooling block may be set to be different according to types of an insulator. The thermoelectric element may be provided in plurality on upper and lower sides of the through hole formed at a central portion of a rear surface of the case.

The water cooling apparatus may further include a fan blowing ambient air to the heat dissipation block. The fan may be mounted in plurality on a rear surface of the heat dissipation block and air passing through blades of the fan may be in contact with a portion of the heat dissipation block overlapping the thermoelectric element in a thickness direction.

The cold water tank may include a tank body having a flat rectangular shape; a cover having a water inlet and a water outlet and coupled to the tank body to cover the front surface of the tank body; and an internal flow channel provided within the tank body and guiding purified water introduced through the water inlet to the water outlet. The water outlet may be positioned to be higher than the water inlet in a direction opposite to gravity.

A partial amount of purified water accommodated in the internal flow channel may be cooled by the cooling block so as to be changed to ice having a predetermined thickness, and purified water introduced to the internal flow channel may be cooled to be changed to cold water through heat exchange with the ice and ejected. A thickness of the ice may be ⅓ to ⅔ of a thickness of the tank body.

Since the cooling block and the heat dissipation block have separate fastening structures with the case interposed therebetween, heat loss and a degradation of cooling performance occurring when one fastener connects the cooling block and the heat dissipation block as in the related art may be prevented.

Since a contact area between the cooling block and the cold water tank is equal to a size of the cold water tank, the cold of the cooling block is uniformly transmitted to the entire surface of the cold water tank, and thus, ice may be uniformly formed with a predetermined thickness on the entire surface within the cold water tank, time for generating cold water is shortened through heat exchange between ice and purified water, and an eject amount of cold water may be secured even with the small tank.

Since the cold water tank and the cooling block are provided within the case and the insulator covers the cold water tank and the cooling block, leakage of the cold of the cold water tank and the cooling block may be minimized.

Since the cooling block and the heat dissipation block are spaced apart from each other and the insulator is provided between the cooling block and the heat dissipation block, generation of due condensation on the cooling block may be prevented.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid cooling apparatus, comprising:
a case;
a tank provided within the case;
a cooling block provided to be in contact with the tank and to cool the tank through a heat exchange;
a thermoelectric element having a first side in contact with the cooling block and configured to transfer heat from the first side to a second side of the thermoelectric element when power is applied thereto;
an insulator provided within the case and that covers the tank and the cooling block; and
a heat dissipation block provided outside of the case and provided to be in contact with the second side of the thermoelectric element to dissipate heat from the second side of the thermoelectric element,
wherein the cooling block is fastened to the case with a plurality of first fasteners, and the heat dissipation block is fastened to the case with a plurality of second fasteners,
wherein the cooling block includes:
a first cooling block part having a first surface in contact with the tank; and
a second cooling block part that extends from a second surface of the first cooling block part opposite the first surface, having an area smaller than an area of the first cooling block part, and provided to be in contact with the thermoelectric element,
wherein the case includes a plurality of first screw holders formed as countersinks on a first surface of the case, the plurality of first screw holders being configured to be spaced apart from each other on the first surface of the case,
wherein a plurality of third screw holders protrude from the second surface of the first cooling block part to the first screw holders, respectively,
wherein the plurality of first fasteners pass through the plurality of first screw holders to be coupled to the plurality of third screw holders, respectively,
wherein the first surface of the case faces the heat dissipation block,
wherein the case further includes a plurality of second screw holders formed as countersinks on the first surface of the case at positions different from the plurality of first screw holders, and
wherein the plurality of second fasteners is fastened to the plurality of second screw holders through the heat dissipation block, respectively, and the insulator surrounds the plurality of third screw holders and the cooling block to block heat exchange between the cooling block and the heat dissipation block.

2. The liquid cooling apparatus of claim 1, wherein the plurality of first screw holders and the plurality of second screw holders are spaced apart from each other.

3. The liquid cooling apparatus of claim 1, wherein the second side of the thermoelectric element is in contact with the heat dissipation block when the heat dissipation block is fastened to the case by the second fastener.

4. The liquid cooling apparatus of claim 3, wherein the insulator includes a plurality of fastening holes formed on a first side of the insulator that faces the heat dissipation block, and wherein the plurality of first fasteners and the plurality of second fasteners penetrate the plurality of fastening holes, respectively.

5. The liquid cooling apparatus of claim 4, wherein the thermoelectric element is provided in a through hole formed in the case, and wherein the plurality of first fastening parts and the plurality of second fastening parts are alternately provided along edges of the through hole.

6. The liquid cooling apparatus of claim 4, wherein the thermoelectric element is provided in plurality in the through hole which is formed at a central portion of the first surface of the case.

7. The liquid cooling apparatus of claim 1, wherein the cooling block and the heat dissipation block are spaced apart from each other, and wherein the first surface of the case and the thermoelectric element, provided in a through hole of the first surface of the case, are provided between the cooling block and the heat dissipation block.

8. The liquid cooling apparatus of claim 1, wherein
a first side of the cooling block is in contact with a first surface of the tank and a second side of the cooling block is in contact with a first side of the thermoelectric element, and a contact area of the first side of the cooling block is equal to an area of the first surface of the tank.

9. The liquid cooling apparatus of claim 1, further comprising a fan configured to circulate air towards the heat dissipation block.

10. The liquid cooling apparatus of claim 9, wherein the fan comprises a plurality of fans mounted on a rear surface of the heat dissipation block and air cycled by the fan is configured to contact a portion of the heat dissipation block that overlaps the thermoelectric element.

11. The liquid cooling apparatus of claim 1, wherein the heat dissipation block includes:
a heat dissipation plate; and
a plurality of heat dissipation fins.

12. The liquid cooling apparatus of claim 11, wherein the heat dissipation plate has a rectangular shape and is configured to be in contact with the thermoelectric element.

13. The liquid cooling apparatus of claim 12, wherein the plurality of heat dissipation fins protrude from the heat dissipation plate to expand a contact area for air.

14. The liquid cooling apparatus of claim 13, wherein the plurality of heat dissipation fins extend in a transverse direction and are spaced apart from each other in a longitudinal direction.

15. A liquid purifier comprising the liquid cooling apparatus of claim 1.

* * * * *